(12) United States Patent
Guthrie et al.

(10) Patent No.: US 9,074,691 B2
(45) Date of Patent: Jul. 7, 2015

(54) FLOW ADJUSTER AND KEY COMBINATION

(71) Applicant: LAVELLE INDUSTRIES, INC., Burlington, WI (US)

(72) Inventors: Kevin J. Guthrie, Wind Lake, WI (US); Jordan D. Smith, New Berlin, WI (US)

(73) Assignee: Lavelle Industries, Inc., Burlington, WI (US)

( * ) Notice: Subject to any disclaimer, the term of this patent is extended or adjusted under 35 U.S.C. 154(b) by 182 days.

(21) Appl. No.: 13/748,742

(22) Filed: Jan. 24, 2013

(65) Prior Publication Data

US 2013/0187072 A1    Jul. 25, 2013

Related U.S. Application Data

(60) Provisional application No. 61/590,108, filed on Jan. 24, 2012.

(51) Int. Cl.
*F16K 5/12* (2006.01)
*F16K 31/60* (2006.01)
*F16K 5/10* (2006.01)

(52) U.S. Cl.
CPC .............. *F16K 5/12* (2013.01); *F16K 31/607* (2013.01); *F16K 5/10* (2013.01)

(58) Field of Classification Search
CPC .............. F16K 1/50; F16K 5/12; F16K 5/10; F16K 31/60; F16K 31/607; F16K 35/06; Y10T 137/7069; Y10T 137/7131; Y10T 137/7225; Y10T 137/7256

USPC ........ 137/383, 384.2, 384.8, 385; 251/89, 90, 251/92, 93, 208, 286, 297; 4/415
See application file for complete search history.

(56) References Cited

U.S. PATENT DOCUMENTS

| | | | | |
|---|---|---|---|---|
| 2,192,818 | A | * | 3/1940 | Schmidt .................... 137/315.25 |
| 2,536,275 | A | * | 1/1951 | Godshall ........................ 137/556 |
| 2,701,030 | A | * | 2/1955 | Hazelton .......................... 55/417 |
| 4,844,115 | A | * | 7/1989 | Bowers ........................... 137/240 |
| 5,052,655 | A | * | 10/1991 | Ackroyd ............................ 251/95 |
| 6,892,996 | B2 | * | 5/2005 | Starchevich ........................ 251/6 |
| 6,959,909 | B2 | * | 11/2005 | Bancroft et al. ............... 251/109 |
| 8,544,499 | B2 | * | 10/2013 | Rickey ....................... 137/601.19 |
| 2003/0136933 | A1 | * | 7/2003 | Kapczynski et al. .......... 251/286 |
| 2006/0219970 | A1 | * | 10/2006 | Budde ............................ 251/286 |
| 2010/0037380 | A1 | * | 2/2010 | Robbins et al. ..................... 4/415 |
| 2012/0174308 | A1 | * | 7/2012 | Cheerla et al. ..................... 4/415 |
| 2013/0015380 | A1 | * | 1/2013 | Hemman et al. ................ 251/93 |

* cited by examiner

*Primary Examiner* — Matthew W Jellett
(74) *Attorney, Agent, or Firm* — Joseph S. Heino; Patrick M. Bergin

(57) ABSTRACT

A fluid flow control adjuster device controls fluid flow ratios when placed in-line with a tube that runs from a toilet fill valve to the overflow tube of a flush valve. The device comprises an adjuster having an adjuster body with an inlet and an outlet. The body includes an adjuster knob and a receiver gap, which is a gap between a body rotation stop and another edge at a top surface of the adjuster knob. A key is also provided which can be inserted between the body rotation stop and the edge of the adjuster so that the installer can dial in the correct percentage of fill. The key is a hub-like planar structure that matches the curvature of the receiver and includes a plurality of key fingers with each finger including indicia that correlate to settings for selecting a proper toilet bowl refill range.

6 Claims, 2 Drawing Sheets

FLOW ADJUSTER AND KEY COMBINATION

This Application claims the benefit of U.S. Provisional Application No. 61/590,108, filed Jan. 24, 2012.

FIELD OF THE INVENTION

The present invention relates to indoor plumbing, and more particularly, to gravity-operated flush toilets, and to the fill valves and flush valves that are used with such toilets. It also relates specifically to a fluid flow control device having, in combination, a fluid flow adjuster and a key that can be used for setting the refill ratio for water flowing from a fill valve to the overflow tube of a flush valve.

BACKGROUND OF THE INVENTION

A conventional gravity-operated flush toilet has several basic components. The porcelain or china components include a bowl and a water tank mounted on top of a rear portion of the bowl. The bowl and tank are usually separate pieces bolted together to form a so-called two-piece toilet. Modern gravity-operated flush toilets are frequently made as a so-called one-piece toilet in which the bowl and tank are made as one continuous integral piece of china.

The plumbing components of a gravity-operated flush toilet include a fill valve in the tank which is connected to a water supply line, a flush valve surrounding a drain hole in the bottom of the tank that communicates with the bowl, and a flapper valve that normally closes and seals the flush valve. The plumbing components further include a control such as a pushbutton or lever mounted on a wall of the tank that moves a lever whose remote end is connected to the flapper valve for lifting the same.

In the experience of these inventors, a water flow adjuster may be interposed between a toilet fill valve and the overflow tube of a flush valve. The water flow adjuster may comprise a flow device with means for controlling flow that ranges from fully open to fully closed (i.e., where flow is stopped). In the art of toilet fill valves, however, the use of such a device is desirable and particularly where the flow can be carefully controlled. Accordingly, there is a need to provide a flow control device combined with a means for carefully and more precisely controlling the flow ratio. There is also a need to provide such a flow adjuster and control means that allows a toilet installer to mechanically adjust the percentage of toilet bowl fill using a numbering system where the key numbers correspond to specific toilets and/or to specific refill amounts.

SUMMARY OF THE INVENTION

In accordance with the present invention, there is provided a fluid flow control adjuster device that is combined with a means for carefully and more precisely controlling the flow ratio through the adjuster device. This flow control device has particular application when placed in-line with a tube that runs from a toilet fill valve to the overflow tube of a flush valve. The device of the present invention comprises an adjuster portion, or "adjuster," having an adjuster body with an inlet and an outlet. The body includes an adjuster knob and a receiver gap, which is a gap between a body rotation stop and another edge at a top surface of the adjuster knob. A key portion, or "key," is also provided, which key can be inserted between the body rotation stop and the edge of the adjuster so that the installer can dial in the correct percentage of fill to eliminate weir line spill over. The key is a hub-like planar structure that matches the curvature of the receiver and includes a plurality of key fingers with each finger including indicia that correlate to settings for selecting a proper toilet bowl refill range.

The foregoing and other features of the adjuster device and key combination of the present invention will be apparent from the detailed description that follows.

DETAILED DESCRIPTION

Figure 1:
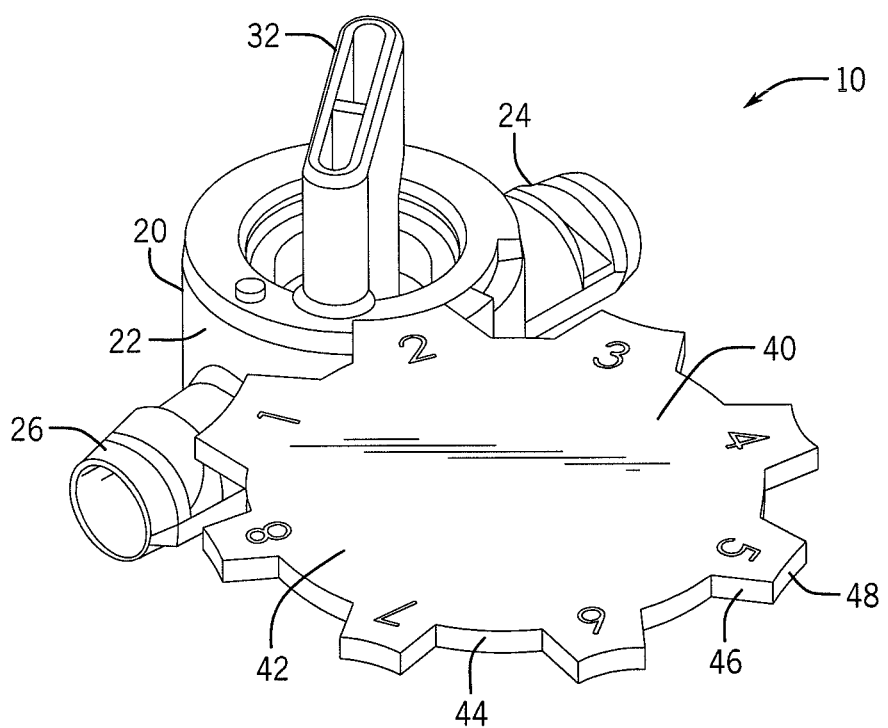
FIG. 1 is a top perspective view of the adjuster device and key combination that is constructed in accordance with the present invention.

Referring now to the drawings in detail, wherein like-numbered elements refer to like elements throughout, FIG. 1 illustrates a fluid flow control device, generally identified 10, which is constructed in accordance with the present invention. The device 10 is comprised, in combination, of an adjuster portion, or simply "adjuster," 20 and a key portion, or simply "key," 40.

Figure 3:
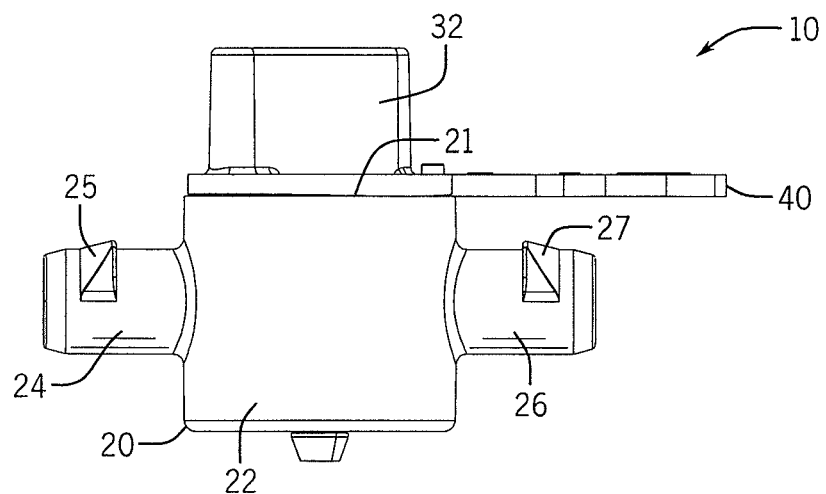
FIG. 3 is a side elevational view of the adjuster device and key combination shown in FIGS. 1 and 2.

As shown in FIG. 3, the adjuster device 20 comprises an adjuster body 22 having an internal flow cavity (not shown), an inlet port 24 and an outlet port 26. Each of the ports 24, 26 includes a central aperture through which water can flow into and out of the adjuster body 22, respectively. Each of the ports 24, 26 also includes a hose barb 25, 27, respectively, for anchoring a tube (also not shown) to each port.

Figure 2:
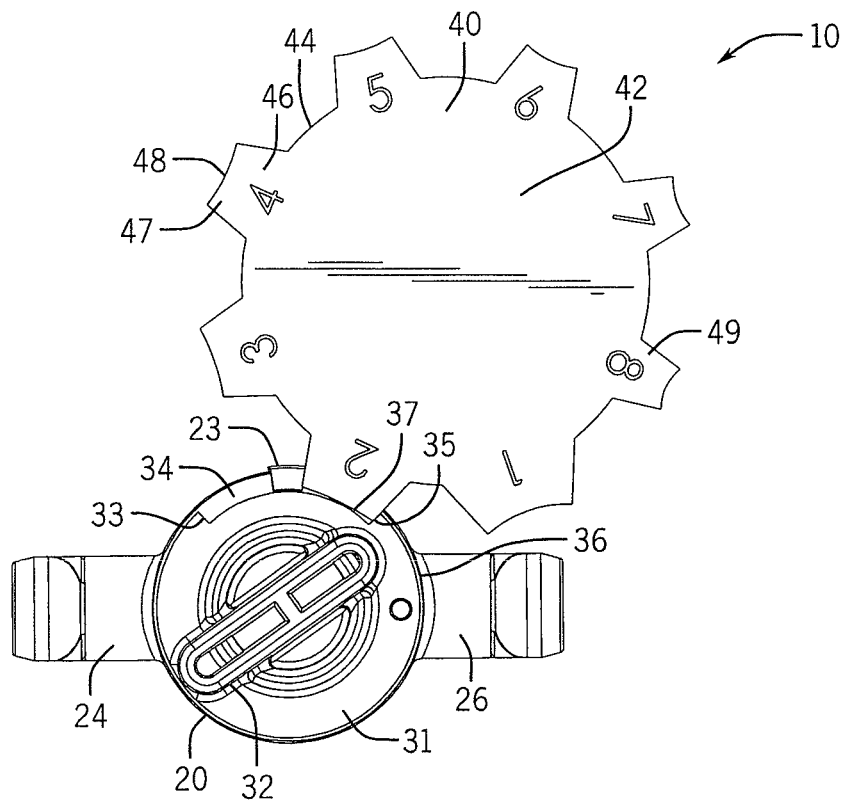
FIG. 2 is a top plan view of the adjuster device and key combination illustrated in FIG. 1.

As shown in FIG. 2, the adjuster 20 further comprises a rotation knob 32 which is "captured" within the adjuster 20, the knob 32 intended to be manually rotated within the adjuster 20. Rotation of the knob 32 serves to control the flow of water through the body 22 of the adjuster 20. The adjuster body 22 has two internal O-rings (not shown) which seal off top and bottom water flow around the internal portion (also not shown) of the knob 32 that is disposed within the adjuster body 22. It will also be seen in FIG. 2 that the top portion 21 of the adjuster body 22 comprises a body rotation stop member 23. The top portion 31 of the rotation knob 32 comprises an adjuster arc 34 along a peripheral edge 36 of the rotation knob 32. The arc 34 is bounded by and comprises a first end stop face 33 and a second end stop face 35. As shown in FIG. 2, the rotation of the knob 32 is limited by means of the body rotation stop member 23 as the first and second end stop faces 33, 35 of the arc 34 are engaged by knob 32 rotation clockwise and counterclockwise, respectively. Where the stop member 23 is disposed against the first end stop face 33 of the arc 34, fluid flow through the adjuster 20 is maximized. Where the stop member 23 is disposed against the second end stop face 35 of the arc 34, fluid flow through the adjuster 20 is minimized or stopped altogether. Further, that portion of the arc 34 which is disposed between the stop member 23 and the second end stop face 35 creates a measuring or "key" gap 37. That is, a key gap 37 is formed between the body rotation stop member 23 and the second end stop 35 of the arc 34. This key gap 37 is that portion of the device 20 where the key 40, or a portion of it, is used.

The key 40 is a substantially flat planar structure that comprises a central hub-like portion 42 and an outer perimeter 44. The outer perimeter 44 of the key 40 comprises a plurality of fingers 46, each finger 46 having a different width as compared to the others. Each finger 46 further comprises indicia 49. In the embodiment illustrated in FIGS. 1 and 2, the indicia 49 are numbers. The end 47 of each finger 46 further comprises an inwardly arced portion 48. This inwardly arced portion 48 matches the inner diameter of the arc 34 as is shown in FIG. 2. In this way, the installer will know that the finger 46 with its assigned indicia 49 will result in a flow ratio that is intended for the particular application that is desired or required.

Although the foregoing has been described with a certain degree of particularity, it is to be understood that the present disclosure has been made by way of example only and that numerous changes in the construction and the arrangement of components, some of which have been alluded to, may be resorted to without departing from the spirit and scope of the invention as it is described.

We claim:

1. A fluid flow control device comprising the combination of:
    an adjuster comprising:
        an adjuster body comprising an internal flow cavity and a top portion that comprises a body rotation stop member;
        an inlet port to the flow cavity and an outlet port;
        a fluid flow control functionality via a receiver gap that is defined within the adjuster;
        a rotation knob captured within the adjuster body, the knob being rotatable and comprising a top portion, the top portion of the knob further comprising an arc, the arc forming part of the receiver gap and the receiver gap further being bounded by a first end stop face and a second end stop face, the knob being movable between a first position where the body rotation stop member is disposed adjacent the first end stop face, a second position where the body rotation stop member is disposed adjacent the second end stop face, and a plurality of positions therebetween; and
    a key that is a separate structure and is detached from the adjuster for variably setting the fluid flow control of the adjuster via the receiver gap, the key comprising:
        a central hub-like portion;
        an outer perimeter; and
        a plurality of fingers disposed about the outer perimeter of the key, wherein each finger of the plurality of fingers comprises a width and the width of each finger is different from the width of the other fingers in the plurality of fingers.

2. The flow control device of claim 1 wherein the adjuster further comprises a hose barb disposed on each port for anchoring a tube to each port.

3. The flow control device of claim 1 wherein each finger of the plurality of fingers is individually positionable within the receiver gap of the rotation knob.

4. The flow control device of claim 3 wherein positioning of a finger of the separate and detached key between the body rotation stop member and the second end stop face of the arc creates a flow setting for the adjuster.

5. The flow control device of claim 3 wherein each finger comprises an indicia that differs from the indicia of the other fingers and the indicia of each finger correlates to a setting for selecting a flow setting for the adjuster.

6. The flow control device of claim 4 wherein the arc of the rotation knob has a radius and wherein the end of each finger comprises an inwardly arced portion having a radius that matches the radius of the arc of the rotation knob.

* * * * *